(12) United States Patent
Bernoth et al.

(10) Patent No.: US 7,937,353 B2
(45) Date of Patent: May 3, 2011

(54) METHOD AND SYSTEM FOR DETERMINING WHETHER TO ALTER A FIREWALL CONFIGURATION

(75) Inventors: Andrew Bernoth, Lara (AU); Medardo Roberto Sandoval, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 1118 days.

(21) Appl. No.: 11/623,160

(22) Filed: Jan. 15, 2007

(65) Prior Publication Data

US 2008/0172347 A1    Jul. 17, 2008

(51) Int. Cl.
*G06N 5/02*    (2006.01)
(52) U.S. Cl. .......... 706/46; 709/225; 709/229; 709/238; 726/11; 726/13
(58) Field of Classification Search .............. 706/46; 709/225, 229, 238; 726/13, 11
See application file for complete search history.

(56) References Cited

U.S. PATENT DOCUMENTS

| | | | |
|---|---|---|---|
| 6,061,797 A | 5/2000 | Jade et al. | |
| 6,212,558 B1* | 4/2001 | Antur et al. | 709/221 |
| 6,226,372 B1 | 5/2001 | Beebe et al. | |
| 6,519,703 B1* | 2/2003 | Joyce | 726/22 |
| 6,535,227 B1* | 3/2003 | Fox et al. | 715/736 |
| 6,895,383 B2* | 5/2005 | Heinrich | 705/7 |
| 6,906,709 B1 | 6/2005 | Larkin et al. | |
| 6,912,676 B1* | 6/2005 | Gusler et al. | 714/47 |
| 2002/0107961 A1 | 8/2002 | Kinoshita | |
| 2003/0120955 A1 | 6/2003 | Bartal et al. | |
| 2004/0015719 A1 | 1/2004 | Lee et al. | |
| 2005/0160480 A1* | 7/2005 | Birt et al. | 726/25 |
| 2005/0268335 A1* | 12/2005 | Le et al. | 726/13 |
| 2006/0031373 A1* | 2/2006 | Werner et al. | 709/207 |
| 2006/0174337 A1 | 8/2006 | Bernoth | |

FOREIGN PATENT DOCUMENTS

WO    WO 2004109971 A1    12/2004

OTHER PUBLICATIONS

"An Expert System for analyzing firewall rules", Pasi Eronen, Jukka Zitting, Helsinki University of Technology, NordSec 2001 Conference, Copenhagen, Nov. 2001, pp. 1-8.*
"An Expert System for preventing and auditing intrusion", Zong-pu Jia, Zhi-lin Yao, Shu-fen Liu, Proceedings of the 9th International Conference on Computer Supported Cooperative Work in Design, May 24-26, 2005, vol. 2, pp. 852-855.*
"Taxonomy of Conflicts in Network Security Policies", Hazem Hamed, Ehad Al-Shaer, DePaul University, IEEE Communications Magazine, vol. 44 No. 3, pp. 134-141, Mar. 2006.*

* cited by examiner

*Primary Examiner* — Donald Sparks
*Assistant Examiner* — Mai T Tran
(74) *Attorney, Agent, or Firm* — Schmeiser, Olsen & Watts; Arthur J. Samodovitz

(57) ABSTRACT

A method and system for determining whether to alter a firewall configuration. Message flow data associated with a message packet blocked by a firewall is received. The packet was blocked based on the firewall not having a message flow rule that permitted passage of the message packet. Risk values associated with a source network, destination network and destination port are identified by the message flow data. Based on the risk values, an electronic recommendation indicating whether to add to the firewall a message flow rule that permits the message flow to pass is determined and generated.

20 Claims, 10 Drawing Sheets

| Network | Zone<br>1 – Trusted<br>2 – DMZ<br>3 – Known but Not Trusted<br>4 - Unknown | Source Network<br>0 – Authorized<br>1 – Unauthorized | Destination Network<br>0 – Authorized<br>1 – Unauthorized | Breach Impact<br>0 – Low<br>1 – Medium<br>2 - High |
|---|---|---|---|---|
| Network A | 1, 2 or 3 | 0 or 1 | 0 or 1 | 0 – 2 |
| Network B | 1, 2 or 3 | 0 or 1 | 0 or 1 | 0 – 2 |
| Network C | 1, 2 or 3 | 0 or 1 | 0 or 1 | 0 – 2 |
| Default | 4 | 1 | 1 | 2 |

| Zone | Zone Risk Value | Description |
|---|---|---|
| Trusted | 1 | Known security control, no direct external access. Low risk. |
| DMZ | 2 | Known security control, filtered external access. Medium risk. |
| Not Trusted | 3 | Unknown security control, unfiltered external access. High risk |
| Unknown | 4 | Unknown security control, unknown external access. High risk. |

| Source Network | Source Network Risk Value | Description |
|---|---|---|
| Authorized | 0 | Identified as a zone expected to act as the source in a communications session |
| Unauthorized | 1 | Identified as a zone expected not to act as the source in a communications session |

| Destination Network | Destination Network Risk Value | Description |
|---|---|---|
| Authorized | 0 | Identified as a zone expected to act as the destination in a communications session |
| Unauthorized | 1 | Identified as a zone expected not to act as the destination in a communications session |

| Breach Impact | Breach Impact Risk Value | Description |
|---|---|---|
| Low | 0 | No confidential data. Low financial impact. Low risk. |
| Medium | 1 | Some confidential data. Medium financial impact. Medium risk. |
| High | 2 | Confidential data. High financial impact. High risk. |

| Destination Network | Port | Destination Port | Port Weight |
|---|---|---|---|
| All | 0 – 65,536 | 0 – Authorized<br>1 – Unauthorized | 1 – Low<br>-<br>10 – High |
| | e.g., 12345 | 1 | 10 |
| Network B | 0 – 65,536 | 0 or 1 | 1, 2 or 3 |
| Network C | 0 – 65,536 | 0 or 1 | 1, 2 or 3 |
| Default | 0 – 65,536 | 1 | 8 |

| Destination Port | Destination Port Risk Value | Description |
|---|---|---|
| Authorized | 0 | Identified as a port expected to act as the destination in a communications session for the given network |
| Unauthorized | 1 | Identified as a port expected to never act as the destination in a communications session for the given network |

| Weight | Weight Value | Description |
|---|---|---|
| Low | 1 | Secure or expected application port. Low risk. |
| Medium | 5 | Acceptable application port, not currently in use, but potentially required. Medium risk. |
| Default | 8 | No known vulnerability, application unknown. High risk. |
| High | 10 | Known vulnerability. High risk. |

|  | Trusted | DMZ | Not Trusted |
|---|---|---|---|
| Trusted | 1 | 2 | 3 |
| DMZ | 2 | 2 | 2 |
| Not Trusted | 3 | 2 | 3 |

| | Low | High | Trusted to DMZ | Known / Untrusted to DMZ | Known / Untrusted to DMZ Source | Unknown to DMZ with Unknown Port | Unknown to DMZ with Known Port |
|---|---|---|---|---|---|---|---|
| Source Network Zone | 1 | 4 | 1 | 3 | 3 | 4 | 4 |
| Source Network Authorization | 0 | 1 | 0 | 0 | 0 | 1 | 1 |
| Destination Network Zone | 1 | 4 | 2 | 2 | 2 | 2 | 2 |
| Destination Network Authorization | 0 | 1 | 0 | 0 | 1 | 0 | 0 |
| Destination Network Breach Impact | 0 | 2 | 0 | 2 | 2 | 2 | 2 |
| Destination Network Port Authorization | 0 | 1 | 1 | 1 | 1 | 1 | 0 |
| Port Weight | 1 | 10 | 10 | 5 | 5 | 8 | 3 |
| Network-to-Network Risk | 1 | 3 | 2 | 2 | 2 | 2 | 2 |
| Total Risk | 1 | 75 | 22 | 24 | 28 | 34 | 18 |

_FIG. 12_

METHOD AND SYSTEM FOR DETERMINING WHETHER TO ALTER A FIREWALL CONFIGURATION

FIELD OF THE INVENTION

The present invention relates to a method and system for utilizing an expert system to determine whether to alter a firewall configuration.

BACKGROUND OF THE INVENTION

In a conventional system that manages a security policy of a firewall, a firewall administrator is required to assess a suggested change to a firewall configuration before the configuration change occurs. This assessment requires a significant amount of time and human resources to find and analyze data relevant to a customer's control points and agreements, potentially delaying a change to a firewall, where the delay causes the customer to open a problem ticket. Further, multiple assessments of similar data is a manual process that provides inconsistent analysis. Thus, there exists a need to overcome at least one of the preceding deficiencies and limitations of the related art.

SUMMARY OF THE INVENTION

The present invention provides a computer-implemented method of utilizing an expert system to determine whether to alter a firewall configuration. The method includes, for example, the following steps performed by an expert system of a computing system: (1) receiving message flow data (e.g., source network, destination network and destination port) associated with a message packet that is blocked by a firewall; (2) assigning predefined risk values to the message flow data; (3) determining a total risk value associated with the message packet; and (4) generating a proposal based on the total risk value. The proposal suggests either that (i) a message flow rule that permits a message flow associated with the message flow data is to be added to a set of one or more message flow rules or (ii) the message flow rule described in (i) is not to be added to the set of one or more message flow rules. The firewall's blocking of the message packet (see step (1)) is based on the message flow not being permitted by the set of one or more message flow rules. Each risk value assigned in step (2) is associated with the source network, the destination network or the destination port included in the message flow data. The determination of the total risk value in step (3) includes utilizing the risk values assigned in step (2).

A computing system, computer program product, and process for supporting computing infrastructure corresponding to the above-summarized method are also described and claimed herein.

Advantageously, the present invention provides a technique for using an expert system to propose firewall configuration changes to an administrator based on pre-approved risk levels. Further, the present invention's usage of the expert system and its configuration of acceptable security guidelines that are defined as the guidelines become available reduces the time needed for a firewall administrator to make decisions regarding firewall configuration changes (e.g., eliminates the manual process of locating security guidelines as firewall configuration problems occur). Still further, the present invention provides an automated and consistent analysis of conditions that determine whether to alter a firewall configuration.

BRIEF DESCRIPTION OF THE DRAWINGS

FIG. 3 is a network definition table used in the process of FIGS. 2A-2B, in accordance with embodiments of the present invention.

FIG. 4 is a zone risk table used to populate the table of FIG. 3, in accordance with embodiments of the present invention.

FIG. 5 is a source network authorization risk table used to populate the table of FIG. 3, in accordance with embodiments of the present invention.

FIG. 6 is a destination network authorization risk table used to populate the table of FIG. 3, in accordance with embodiments of the present invention.

FIG. 7 is a network breach impact risk table used to populate the table of FIG. 3, in accordance with embodiments of the present invention.

FIG. 8 is a port definition table used in the process of FIGS. 2A-2B, in accordance with embodiments of the present invention.

FIG. 9 is a destination port authorization table used to populate the table of FIG. 8, in accordance with embodiments of the present invention.

FIG. 10 is a port weighting table used to populate the table of FIG. 8, in accordance with embodiments of the present invention.

FIG. 11 is a network-to-network communication risk table used in the process of FIGS. 2A-2B, in accordance with embodiments of the present invention.

FIG. 12 is a table of sample total risk values calculated in the process of FIGS. 2A-2B, in accordance with embodiments of the present invention.

DETAILED DESCRIPTION OF THE INVENTION

The present invention includes a system configured with security guidelines that define acceptable security risks documented in, for example, corporate and/or customer contracts. Upon the blocking of a message packet by a firewall, the system utilizes a firewall log to automatically collect information related to the message packet that is attempting to pass through the firewall. The system compares that information with the data included within the defined acceptable security risks to determine whether a set of firewall rules needs to be reconfigured to permit a flow associated with the message packet. That is, the system identifies possible false positives in the firewall log, thereby identifying potentially valid traffic that the firewall is blocking. The information collected by the system includes, for example, (1) the level of risk and sensitivity of the message packet's destination port (e.g., sensitivity of the application or database behind the destination port); (2) the type of source and destination network (e.g., trusted, in a demilitarized zone (DMZ), or untrusted); (3) whether another network with the same or lower sensitivity has access to the destination port; and (4) other ports to which the source network has access.

As used herein, a flow (a.k.a. message flow) is defined as a combination of source and destination networks, a protocol and source and destination ports of a message packet and data payload as defined by the transport protocol. Any combination of a particular message packet's source and destination networks, protocol, and source and destination ports is referred to herein as message flow data. As used herein, a firewall rule (a.k.a. message flow rule) is defined as a specification of the particular message flow data combinations that are permitted to pass through a firewall.

System Overview

Figure 1:
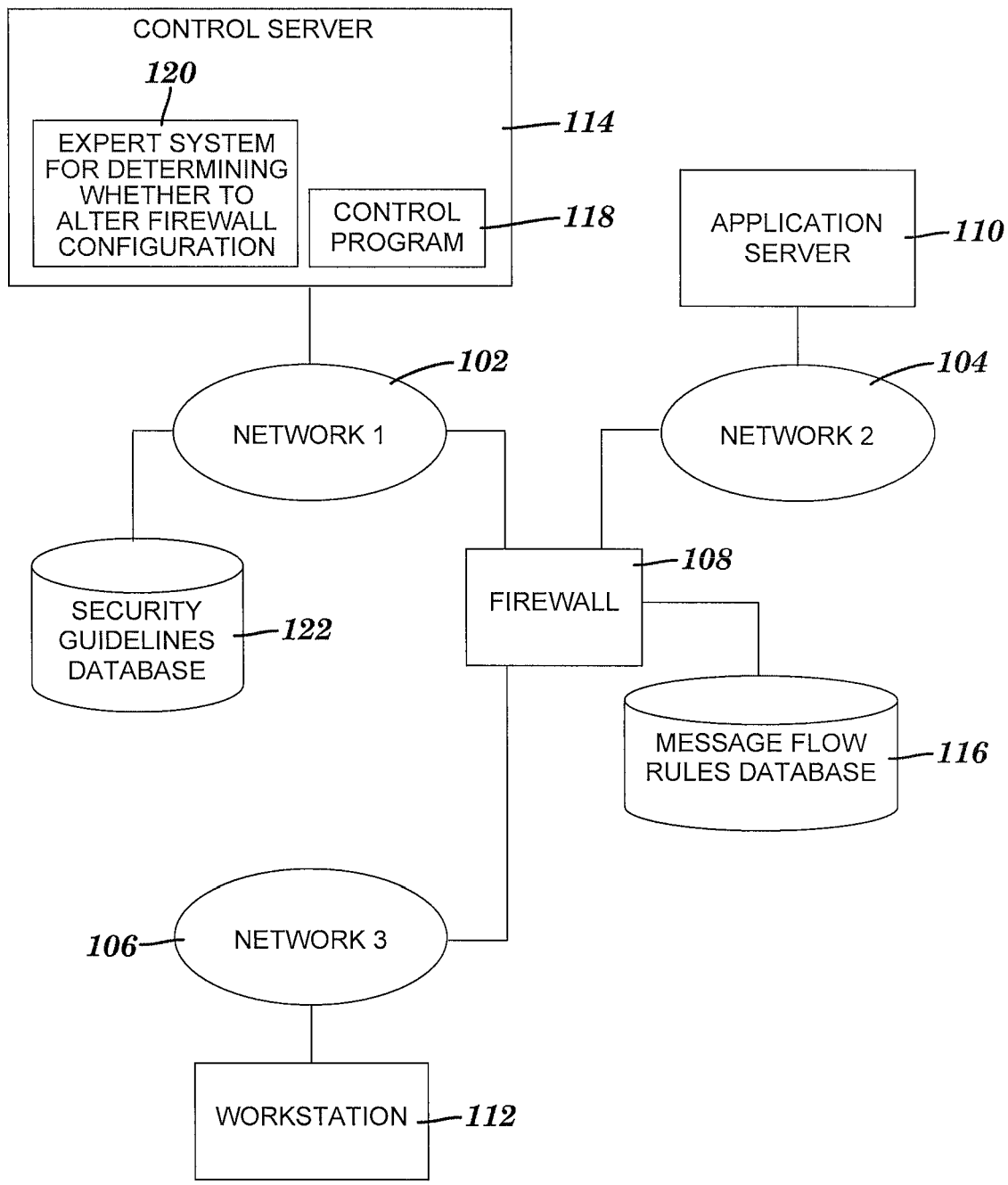
FIG. 1 is a block diagram of a system for utilizing an expert system to determine whether to alter a firewall configuration, in accordance with embodiments of the present invention.

FIG. 1 is a block diagram of a system for utilizing an expert system to determine whether to alter a firewall configuration, in accordance with embodiments of the present invention. System 100 includes a plurality of networks 102, 104 and 106 interconnected by a firewall 108. An application server 110 is coupled to network 104 and a workstation 112 is coupled to network 106. Workstation 112 initiates connectivity to application server 110. Firewall 108 enforces message flow rules of a security policy that is dynamically built based on preapproved levels of risk. The message flow rules are stored within a message flow rules database 116 (a.k.a. firewall rules database) within or accessible to firewall 108. The message flow rules specify what combinations of message flow data associated with message packets are authorized by firewall 108 to pass through the firewall to the packets' intended destination devices and ports. Conversely, if a message packet arrives at firewall 108 and its combination of source/destination networks, source/destination ports, protocol, etc. do not match one of the firewall's message flow rules, then firewall 108 blocks and discards the message. A message packet attempting to flow through firewall 108 is, for example, a Transmission Control Protocol/Internet Protocol (TCP/IP) data packet.

System 100 also includes a control server 114 coupled to network 102. Control server 114 includes a control program 118 and an expert system 120 for determining whether to alter a configuration of firewall 108 and whether a proposed firewall configuration alteration is acceptable based on predefined security guidelines stored in a security guidelines database 122. An example of a firewall configuration alteration is an addition of a message flow rule to message flow rules database 116. Control server 114 investigates message packets which firewall 108 has blocked to determine if the destination port is open such that the message packet may have been blocked erroneously. An example of a computing unit that includes control server 114 is described below relative to FIG. 13.

Although FIG. 1 illustrates expert system 120 as residing in control server 114, the present invention also contemplates system configurations (not shown) in which expert system 120 resides on a computing unit that is separate from, and interfaces with, control server 114. While control server 114 and database 122 are illustrated in system 100 as separate physical devices, they can be replaced by programs executing in a single server 114. Control program 118 provides the functionality of the control program 312 of FIG. 1 of U.S. Patent Application Pub. No. US2006/0174337 entitled "System, Method and Program Product to Identify Additional Firewall Rules that May Be Needed" (hereinafter referred to as the '337 application), which is hereby incorporated by reference, in its entirety.

Determining Whether to Alter Firewall Configurations

Figure 2A:
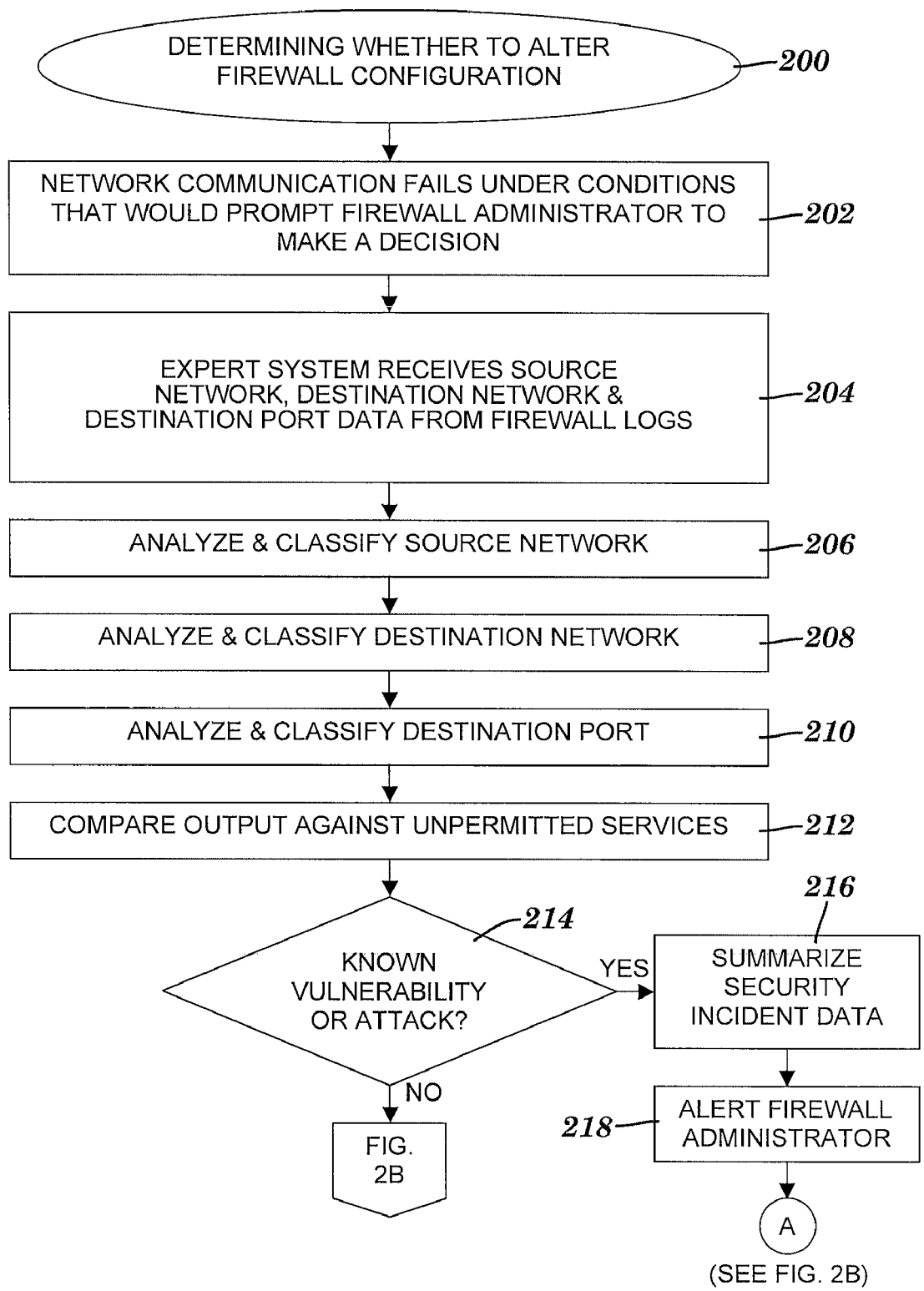
FIGS. 2A-2B depict a flow diagram of a process for utilizing an expert system to determine whether to alter a firewall configuration, in accordance with embodiments of the present invention.
Figure 2B:
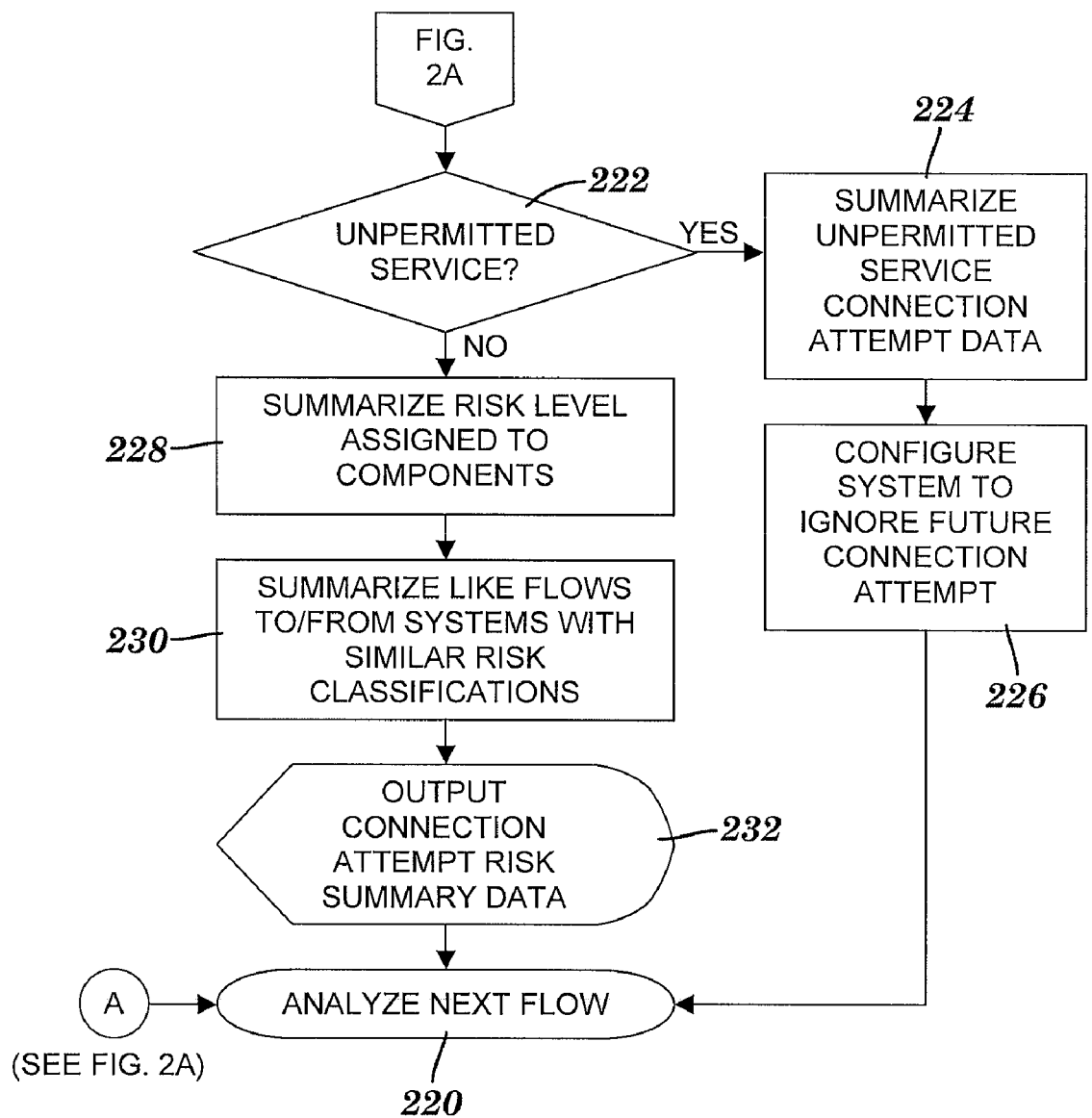

FIGS. 2A-2B depict a flow diagram of a process for utilizing an expert system to determine whether to alter a firewall configuration, in accordance with embodiments of the present invention. The process of FIGS. 2A-2B starts at step 200 of FIG. 2A. In step 202, a network communication of a message packet in system 100 (see FIG. 1) fails under conditions that would prompt a firewall administrator to make a decision about whether to alter a firewall configuration to allow a flow associated with the message packet. In one embodiment, step 202 of FIG. 2A of the present invention corresponds to a message packet being blocked by firewall 108 (see FIG. 1) with any of the control server operating conditions occurring at (1) the No branch of step 322, (2) the No branch of step 324, and (3) the No branch of step 420 in FIGS. 3A, 3A and 3D, respectively, in the '337 application.

In step 204, a logging engine collects message flow data from a firewall log and sends the message flow data to expert system 120 (see FIG. 1). This collection of the message flow data is the initiation of an analysis of a flow. The expert system also receives the message flow data in step 204. The message flow data includes the source network, destination network and destination port associated with a message packet (e.g., TCP/IP data packet) that is blocked by firewall 108 (see FIG. 1) according to message flow rules stored in database 116 (see FIG. 1). In steps 206, 208 and 210, expert system 120 (see FIG. 1) assigns a risk value to each component of the message flow data associated with the message packet blocked in step 202.

In step 206, expert system 120 (see FIG. 1) analyzes and classifies the source network included in the message flow data received in step 204. Step 204 includes classifying the source network with a particular Source Zone Risk Value and a particular Source Network Authorization Risk Value. The Source Zone Risk Value is described below relative to FIGS. 3 and 4. The Source Network Authorization Risk Value is described below relative to FIGS. 3 and 5.

In step 208, expert system 120 (see FIG. 1) analyzes and classifies the destination network included in the message flow data received in step 204. Step 208 includes classifying the destination network with a Destination Zone Risk Value (see FIGS. 3 and 4 and the related discussions below), Destination Network Authorization Risk Value (see FIGS. 3 and 5 and the related discussions below) and Destination Breach Impact Risk Value (see FIGS. 3 and 7 and the related discussions below). Although not shown in FIG. 2A, the expert system also classifies and analyzes the communication between the source network and the destination network with a Communication Risk Value, which is discussed below relative to FIG. 11.

In step 210, expert system 120 (see FIG. 1) analyzes and classifies the destination port included in the message flow data received in step 204. Step 210 includes classifying the destination port with a Destination Port Authorization Risk Value (see FIGS. 8 and 9 and the related discussions below) and a Destination Port Weight (see FIGS. 8 and 10 and the related discussions below).

In step 212, expert system 120 (see FIG. 1) compares the output of steps 206, 208 and 210 against previously defined unpermitted (i.e., non-permitted) services. For example, the expert system compares the destination port classifications determined in step 210 to predefined conditions that indicate that the message packet of step 204 should be denied (see step 222 of FIG. 2B).

If expert system 120 (see FIG. 1) determines in step 214 that the message flow data of step 204 is associated with a known vulnerability or attack (e.g., associated with malware), then the expert system summarizes the security incident data in step 216 and alerts a firewall administrator in step 218 (e.g., notifies the firewall administrator that there is an attempt to access a port that is known to be associated with malware). Expert system 120 (see FIG. 1) initiates an analysis of the next flow in step 220 of FIG. 2B (i.e., the flow associated with the next message packet blocked by firewall 108 (see FIG. 1)).

Returning to inquiry step 214 of FIG. 2A, if expert system 120 (see FIG. 1) determines that the message flow data of step 204 is not associated with a known vulnerability or attack, then the process of determining whether to alter a firewall configuration continues with step 222 of FIG. 2B.

If expert system 120 (see FIG. 1) determines in step 222 that the message packet is associated with an unpermitted service (i.e., the message packet of step 202 is denied based on a predefined security policy), then in step 224, the expert system summarizes data associated with the unpermitted service connection attempt. In step 226, expert system 120 (see FIG. 1) configures a summary table (not shown) so that system 100 (see FIG. 1) ignores any future connection attempt that includes the same message flow data summarized in step 224. Expert system 120 (see FIG. 1) initiates the next flow's analysis in step 220.

Returning to inquiry step 222, if expert system 120 (see FIG. 1) determines that the message packet is not associated with an unpermitted service, then in step 228, the expert system summarizes the risk levels assigned to the components of the message flow data. Step 228 includes the expert system determining a total risk value in a calculation that utilizes the risk values and weights identified in the classification steps 206, 208 and 210. In one embodiment, the expert system calculates the total risk value by using the following formula (a.k.a. the total risk formula):

Total Risk=(Source Zone Risk Value+Source Network Authorization Risk Value+(Destination Zone Risk Value+Destination Network Authorization Risk Value)*Destination Breach Impact Risk Value+Destination Port Authorization Risk Value*Destination Port Weight)*Communication Risk Value In step 228, expert system 120 (see FIG. 1) also matches the total risk value with a range of a set of predefined ranges of total risk values, where the matched range includes the total risk value. Each of the predefined ranges of total risk values corresponds to a predefined action related to notifying an administrator of firewall 108 (see FIG. 1) with a proposal that recommends for or against altering message flow rules database 116 (see FIG. 1) to permit the message packet that had been blocked by firewall 108 (see FIG. 1) in step 202. In step 228, expert system 120 (see FIG. 1) determines the particular proposal that is associated with the calculated total risk value. The set of predefined ranges of total risk values is stored in database 122 (see FIG. 1).

The predefined range associated with a recommendation for altering database 116 (see FIG. 1) includes total risk values that are predetermined to be non-significant risks. That is, the risk of allowing the message packet of step 202 through firewall 108 (see FIG. 1) is low enough to warrant a decision by a firewall administrator as to whether to alter database 116 to allow message packets having a similar risk level.

The predefined range associated with a recommendation against altering database 116 (see FIG. 1) includes total risk values that are predetermined to indicate that allowing associated message packets through firewall 108 (see FIG. 1) presents a significant risk. Because of this significant risk, expert system 120 (see FIG. 1) recommends that database 116 (see FIG. 1) remain unchanged and does not request the firewall administrator to make a decision regarding altering the firewall configuration. Further, if the proposal determined in step 228 recommends against altering the message flow, then the predefined action associated with the proposal includes logging the denial of the message packet of step 202.

In step 230, expert system 120 (see FIG. 1) summarizes like flows to or from systems with similar risk classifications. In step 232, expert system 120 (see FIG. 1) outputs (e.g., to a display for viewing by a firewall administrator) the connection attempt summary data and the proposal determined in step 228. In one embodiment, the output in step 232 is included in a message sent to the firewall administrator in steps 330, 390 and 430 of the '337 application. The message sent in step 232 indicates that a flow associated with the message packet of step 202 was attempted, the flow is not currently allowed by firewall 108 (see FIG. 1), and the firewall administrator needs to consider the proposal determined in step 228. Then the firewall administrator uses the summary data and the proposal determined in step 232 to decide whether to alter the firewall configuration to add a message flow rule (i.e., to allow the flow associated with the message packet of step 202). Following step 232, expert system 120 (see FIG. 1) initiates an analysis of the next flow (i.e., the flow associated with the next message packet blocked by firewall 108 (see FIG. 1)).

Assigning Risk Values

In response to creating a firewall instance (e.g., firewall 108 of FIG. 1) in system 100 (see FIG. 1), each network (e.g., network 104 or 106 of FIG. 1) that is accessible through the created firewall is rated in accordance with a type (i.e., zone) associated with the network, where the type is selected from of a plurality of predefined types. An example of such ratings of networks is shown in a table 300 of FIG. 3. Table 300 is a network definition table that stores risk values of different types used to classify source and destination networks in steps 206 and 208 of the process of FIGS. 2A-2B. Table 300 includes examples of risk values that can be assigned to each network to classify the network's zone, authorization based on whether the network is expected to be a source network, authorization based on whether the network is expected to be a destination network, and breach impact within, for instance, the Zone, Source Network, Destination Network and Breach Impact columns of table 300, respectively. The particular numbers in each data cell of table 300 are only examples, and other numbers can be substituted for the numbers therein. Predefined criteria determine the particular numbers that populate a network definition table used to classify a source network in step 206 of FIG. 2A or to classify a destination network in step 208 of FIG. 2A. If known attributes of a given network are insufficient to utilize the predefined criteria to determine a particular risk value for table 300, then the risk value in the row labeled "Default" is used in steps 206 and/or 208 in FIG. 2A.

In one embodiment, if a given network in table 300 is used only as a source network or only as a destination network, then this information is stored in database 122 (see FIG. 1) as an added security feature. If a message's connection request is initiating from a network that is expected to only receive such connection requests, then a higher priority is assigned to the message. In addition, the breach impact risk level of the last column of table 300 is defined to provide a higher or lower priority to messages. For example, a given network in a DMZ may have a higher breach impact risk value than another network in the DMZ (e.g., a breach on a web server may have a higher breach impact than a breach on an email server). As used herein, a DMZ is defined as a network area positioned between an organizational entity's internal network (i.e., intranet) and an external network not under the control of the organizational entity.

FIG. 4 is an example of a zone risk table 400 that includes the set of zones and zone risk values that are used to populate zone-related cells of a network definition table (e.g., the Zone column of table 300 of FIG. 3). The present invention contemplates defining any number of zones. In the example shown in table 400, four zones are defined: Trusted, DMZ, Not Trusted and Unknown, and their associated descriptions are in the Description column. The Zone Risk Value column of table 400 assigns values that indicate the trust level of each associated zone. In the case of table 400, the lower the risk value, the higher the trust level of the associated zone.

FIG. 5 is an example of a source network authorization risk table 500 that includes the source network authorization risk values used to populate source network authorization-related cells of a network definition table (e.g., the Source Network column of table 300 of FIG. 3). Table 500 classifies networks according to whether or not each network is expected to act as the source of a network communication. If a network is expected to act as a source in a communication session, then the network is classified as Authorized with the lower of two predetermined risk values (e.g., 0); otherwise, the network is classified as Unauthorized with the higher of two predetermined risk values (e.g., 1).

For example, a web server is not expected to initiate a communication request to another entity, so a communication initiation from such a device is considered a higher risk and the web server's network is assigned a risk value (e.g., 1) corresponding to an "Unauthorized" classification in table 500. Conversely, a mail server is expected to initiate connections to other mail servers, so such communications are considered a low risk and the mail server's network is assigned a risk value (e.g., 0) corresponding to an "Authorized" classification in table 500.

FIG. 6 is an example of a destination network authorization risk table 600 that includes the destination network authorization risk values used to populate destination network authorization-related cells of a network definition table (e.g., the Destination Network column of table 300 of FIG. 3). Table 600 classifies networks according to whether or not each network is expected to act as the destination of a network communication. If a network is expected to act as a destination in a communication session, then the network is classified as Authorized with the lower of two predetermined risk values (e.g., 0); otherwise, the network is classified as Unauthorized with the higher of two predetermined risk values (e.g., 1).

For example, a web server is expected to respond to a communication request from another entity, so a communication initiation to such a device is considered a low risk and the web server's network is assigned a risk value (e.g., 0) corresponding to an "Authorized" classification in table 600. Similarly, a mail server is expected to respond to a communication request from other systems and the mail server's network is therefore assigned a low risk value in table 600.

FIG. 7 is an example of a network breach impact risk table 700 that includes the breach impact risk values used to populate breach impact-related cells of a network definition table (e.g., the Breach Impact column of table 300 of FIG. 3). Table 700 classifies the levels of impact associated with breaches of the zones defined in table 400 (see FIG. 4). Although table 700 includes three levels of impact (i.e., Low, Medium and High), the present invention contemplates other numbers of breach levels.

The breach impact risk values in table 700 are based on data sensitivity as defined by an organization's security policy. In one embodiment, the breach impact risk values of table 700 are based on the level of confidentiality required for the data being breached and/or the financial impact to an organization associated with the data being breached.

For example, if someone breaches a company's web server in a DMZ, data regarding the company may be misrepresented or inaccessible. This web server breach may be seen as a medium impact in most environments. Given that the web server resides on a DMZ, it is expected to be expendable. In contrast, a breach of an email server may be capable of rendering the email system inaccessible but still be considered a low impact because other mail would remain in a queue on other mail systems until the email server returns to its accessible state.

FIG. 8 is an example of a port definition table 800 that stores destination port authorization risk values and breach impact values (i.e., port weights) used to classify destination ports in step 210 of the process of FIG. 2A, in accordance with embodiments of the present invention. Within the TCP and UDP protocol as defined by the TCP/IP protocol, a communications session has both a source port and a destination port. In the example shown by table 800, the destination port of a given communications initiation is more relevant than the source port, so the source port is not considered in table 800. In circumstances in which the source port is considered in the total risk calculation (e.g., when an attack is based on the Acknowledge flag being set within the TCP/IP protocol), the present invention includes a port definition table (not shown) that stores source port authorization risk values.

Table 800 defines specific ports and/or ranges of ports and their associated risk values and breach impacts that indicate that the ports or ranges of ports are acceptable to other networks, unacceptable to other networks, or always considered bad (i.e., associated with malware communications). Table 800 also includes a default of all ports that would be considered unauthorized with a potentially high breach impact.

For example, if a known exploit utilizes port 12345 (see the 12345 entry in the first row of data in table 800 under the Port column), then the exploit is always considered unauthorized (i.e., a port authorization risk value of 1 under the Destination Port column) and a high breach impact (i.e., a "high" weight of 10 in the Port Weight column) regardless of the destination network (i.e., due to the "All" indicator in the first column).

FIG. 9 is an example of a destination port authorization table 900 that includes the destination port authorization risk values used to populate a port definition table (e.g., the Destination Port column of table 800 of FIG. 8). The destination port authorization risk values in table 900 are listed under the Destination Port Risk Value column. If a destination port is expected to act as a destination in a communications session for a given network in port definition table 800, then the given network is classified as Authorized with the lower of two predetermined risk values (e.g., 0); otherwise, the network is classified as Unauthorized with the higher of two predetermined risk values (e.g., 1).

For example, a typical web server is authorized to utilize web server ports and not authorized to utilize mail server ports. Thus, for the web server ports, the web server is assigned the risk value associated with the "Authorized" classification in table 900 and for the mail server ports, the web server is assigned the risk value associated with the "Unauthorized" classification in table 900.

FIG. 10 is an example of a port weighting table 1000 that includes port weights used to populate a port definition table (e.g., the Port Weight column of table 800 of FIG. 8). As one example, a lowest weight value is assigned if the port is secure or an expected application port (i.e., the risk associated with the port is low). Further, a medium weight value is assigned if the port is an acceptable application port that is not currently in use, but may potentially be required (i.e., the risk associated with the port is medium). Still further, a default weight value is assigned if there is no known vulnerability associated with the port and the application is unknown. Yet further, a high weight value is assigned if there is a known vulnerability associated with the port (i.e., the risk associated with the port is high). The port weight values in table 1000 weight the destination network port authorization risk values of table 800 (see FIG. 8) within a calculation of total risk value, which is described below relative to FIG. 12.

The classifications under the Weight column in table 1000 and the particular weights under the Weight Value column are only examples. The present invention contemplates any number of weight classifications which may be associated with weight values that are included or not included in table 1000.

A port that is expected to be available typically has a low port weight value if the protocol is considered secure. For instance, the Secure Shell (SSH) protocol used for device management is assigned a lower weight than Telnet since SSH utilizes encryption to enhance security.

A system known to operate a particular server, such as a web server, is assigned a corresponding low weight. In contrast, if mail is available on a particular segment, the weighting for a mail server running on the same system as the web server may be Medium.

FIG. 11 is an example of a network-to-network communication risk table 1100 that includes risk values used to determine the total risk calculation in the process of FIGS. 2A-2B, in accordance with embodiments of the present invention. Table 1100 includes examples of risk values associated with the different combinations of zone-to-zone communication, where the zones are defined in a zone risk table (e.g., table 400 of FIG. 4). A low risk value in table 1100 defines an expected communication connection between the two zones. Conversely, a high risk value in table 1100 defines an unauthorized or unexpected flow between two zones. In table 1100, one of the zones listed as the row labels is the source network of a flow and one of the zones listed as the column labels is the destination network of the flow (or vice versa). For example, a Trusted network being the source and another Trusted network being the destination corresponds to the lowest risk value on table 1100 (i.e., a risk value of 1). The Trusted-to-Trusted flow in this example is assigned a low risk value because the flow is an expected communication connection.

FIG. 12 is a table 1200 illustrating examples of total risk values calculated in step 228 of the process of FIGS. 2A-2B, in accordance with embodiments of the present invention. The risk values and weights included in FIGS. 3-11 are used to populate table 1200. Table 1 presented below describes how the rows of table 1200 relate to FIGS. 3-11.

TABLE 1

| Row of table in FIG. 12 | Description |
| --- | --- |
| Source Network Zone | Uses zone risk values included in the Zone column of table 300 (see FIG. 3) and described in table 400 (see FIG. 4) |
| Source Network Authorization | Uses source network authorization risk values included in the Source Network column of table 300 (see FIG. 3) and described in table 500 (see FIG. 5) |
| Destination Network Zone | Uses zone risk values included in the Zone column of table 300 (see FIG. 3) and described in table 400 (see FIG. 4) |
| Destination Network Authorization | Uses destination network authorization risk values included in the Destination Network column of table 300 (see FIG. 3) and described in table 600 (see FIG. 5) |
| Destination Network Breach Impact | Uses destination network breach impact risk values included in the Breach Impact column of table 300 (see FIG. 3) and described in table 700 (see FIG. 7) |
| Destination Network Port Authorization | Uses destination port authorization risk values included in the Destination Port column of table 800 (see FIG. 8) and described in table 900 (see FIG. 9) |
| Port Weight | Uses port weights included in the Port Weight column of table 800 (see FIG. 8) and described in table 1000 (see FIG. 10) |
| Network-to-Network Risk | Uses network-to-network risk values included in table 1100 (see FIG. 11) |
| Total Risk | Calculated from the values in FIGS. 3-11 |

The total risk values in table 1200 are sample calculations using the total risk formula defined in the discussion relative to FIG. 2B. For example, for a flow associated with the column in table 1200 labeled Trusted to DMZ, the total risk value calculated using the total risk formula is $(1+0+(2+0)*0+1*10)*2=22$, which is the value included in the Total Risk row under the Trusted to DMZ column.

Table 1200 also includes a Low column, which indicates the lowest possible total risk value (i.e., 1). The lowest total risk value is calculated by inserting the lowest possible values into each expression in the total risk formula. Table 1200 also includes High column, which indicates the highest possible total risk value (i.e., 75). The highest total risk value is calculated by inserting the highest possible values into each expression in the total risk formula.

In step 228 of FIG. 2B, expert system 120 (see FIG. 1) matches the result calculated by the total risk value formula to a predefined range of total risk values. As one example, a total risk value of 22 is calculated in step 228 of FIG. 2B and is matched to a predefined range of 1 to 24. Matching the total risk value to the range of 1 to 24 prompts expert system 120 (see FIG. 1) to notify the firewall administrator in step 232 of FIG. 2B with a proposal that a flow associated with the calculated total risk value should not be blocked by firewall 108 (see FIG. 1) and that a change should be made to message flow rules database 116 (see FIG. 1) (e.g., a rule should be added) so that any similar flow will not be blocked by firewall 108 (see FIG. 1).

As another example, a total risk value of 65 is calculated in step 228 of FIG. 2B and is matched to another predefined range of 50 to 75. A match of the total risk value to the 50 to 75 range indicates that the expert system is not to recommend any change in the firewall configuration and a record of the associated flow's denial by the firewall is placed in a log.

Computing System

Figure 13:
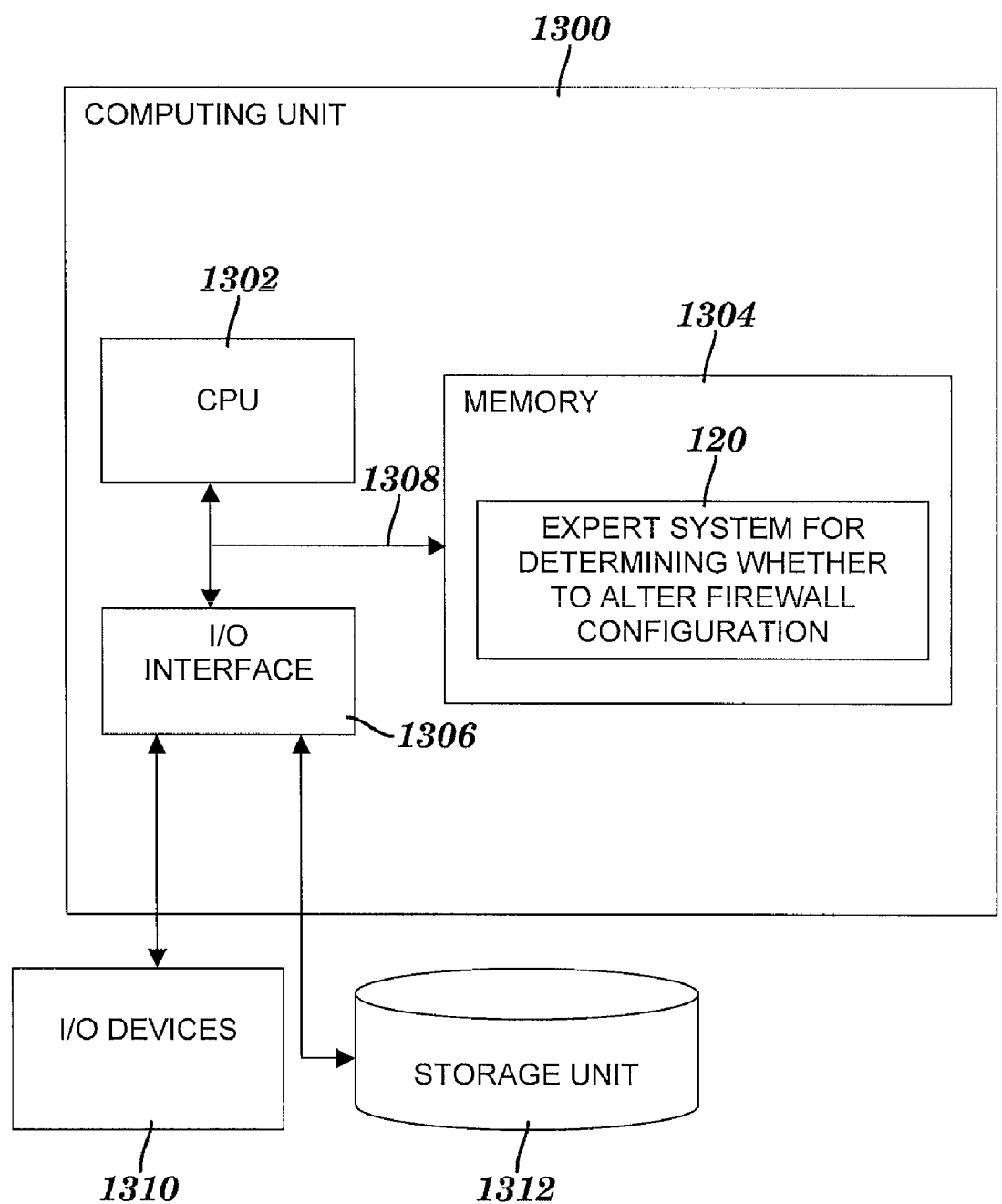
FIG. 13 is a block diagram of a computing system that includes a control server in the system of FIG. 1 and that implements the process of FIGS. 2A-2B, in accordance with embodiments of the present invention.

FIG. 13 is a block diagram of a computing unit that includes expert system 120 shown in FIG. 1 and that implements the process of FIGS. 2A-2B, in accordance with embodiments of the present invention. In one embodiment, computing unit 1300 is control server 114 (see FIG. 1). In another embodiment, control server 114 is separate from computing unit 1300. Computing unit 1300 generally comprises a central processing unit (CPU) 1302, a memory 1304, an input/output (I/O) interface 1306, a bus 1308, I/O devices 1310 and a storage unit 1312. CPU 1302 performs computation and control functions of computing unit 1300. CPU 1302 may comprise a single processing unit, or be distributed across one or more processing units in one or more locations (e.g., on a client and server).

Memory 1304 may comprise any known type of data storage media, including bulk storage, magnetic media, optical media, random access memory (RAM), read-only memory (ROM), a data cache, a data object, etc. Cache memory elements of memory 1304 provide temporary storage of at least some program code (e.g., expert system 120) in order to reduce the number of times code must be retrieved from bulk storage during execution. Moreover, similar to CPU 1302, memory 1304 may reside at a single physical location, comprising one or more types of data storage, or be distributed across a plurality of physical systems in various forms. Further, memory 1304 can include data distributed across, for example, a LAN, WAN or storage area network (SAN) (not shown).

I/O interface 1306 comprises any system for exchanging information to or from an external source. I/O devices 1310 comprise any known type of external device, including a display monitor, keyboard, mouse, printer, speakers, handheld device, printer, facsimile, etc. Bus 1308 provides a communication link between each of the components in computing unit 1300, and may comprise any type of transmission link, including electrical, optical, wireless, etc.

I/O interface 1306 also allows computing unit 1300 to store and retrieve information (e.g., program instructions or data) from an auxiliary storage device 1312. The auxiliary storage device may be a non-volatile storage device such as a magnetic disk drive or an optical disk drive (e.g., a CD-ROM drive which receives a CD-ROM disk). Computing unit 1300 can store and retrieve information from other auxiliary storage devices (not shown), which can include a direct access storage device (DASD) (e.g., hard disk or floppy diskette), a magneto-optical disk drive, a tape drive, or a wireless communication device. In one embodiment, one of the auxiliary storage devices described above includes security guidelines database 122 (see FIG. 1).

Memory 1304 includes expert system 120 for determining whether to alter a firewall configuration stored in message flow rules database 116 (see FIG. 1). Expert system 120 implements steps of the process of FIGS. 2A-2B. Further, memory 1304 may include other systems not shown in FIG. 13, such as an operating system (e.g., Linux) that runs on CPU 1302 and provides control of various components within and/or connected to computing system 1300.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of expert system 120 for determining whether to alter a firewall configuration for use by or in connection with a computing system 1300 or any instruction execution system to provide and facilitate the capabilities of the present invention. For the purposes of this description, a computer-usable or computer-readable medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, RAM 1304, ROM, a rigid magnetic disk and an optical disk. Current examples of optical disks include compact disk—read-only memory (CD-ROM), compact disk—read/write (CD-R/W) and DVD.

Any of the components of the present invention can be deployed, managed, serviced, etc. by a service provider that offers to deploy or integrate computing infrastructure with respect to the present invention's process of using an expert system to determine whether to alter a firewall configuration. Thus, the present invention discloses a process for supporting computer infrastructure, comprising integrating, hosting, maintaining and deploying computer-readable code into a computing system (e.g., computing unit 1300), wherein the code in combination with the computing system is capable of performing a method of using an expert system to determine whether to alter a firewall configuration.

In another embodiment, the invention provides a business method that performs the process steps of the invention on a subscription, advertising and/or fee basis. That is, a service provider, such as a Solution Integrator, can offer to create, maintain, support, etc. a process of the present invention that includes using an expert system to determine whether to alter a firewall configuration. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method to determine whether to alter a firewall configuration, said method comprising:
   a computer receiving message flow data associated with a message packet that was blocked by a firewall based on the firewall not having a message flow rule which permitted passage of said message packet, said message flow data identifying a source network associated with said message packet, a destination network associated with said message packet and a destination port associated with said message packet;
   the computer determining a first risk value and a second risk value that indicate levels of trust respectively associated with first and second zones in which said source and destination networks are respectively located, a third risk value that indicates whether said source network is authorized to be a network that is a source of said message packet in a communication session, a fourth risk value that indicates whether said destination network is authorized to be a network that receives said message packet in said communication session, and a fifth risk value that indicates whether said destination port in said destination network is authorized to be a port that receives said message packet in said communication session; and based on the first, second, third, fourth and fifth risk values, the computer determining and generating an electronic recommendation indicating whether to add to said firewall a message flow rule that permits said message flow to pass.

2. The method of claim 1, further comprising:

the computer assigning a zone risk value to said source network, said assigning said zone risk value including determining that said source network is included in a zone of a plurality of predefined zones, said determining that said source network is included in said zone including determining that a security control associated with said source network is known or unknown and determining that an external access to said source network is filtered, unfiltered, unknown or absent; and the computer assigning a source network authorization risk value to said source network, said assigning said source network authorization risk value including determining if said source network is expected to act as a source in a network communication session based on predefined criteria, wherein said determining and generating said electronic recommendation indicating whether to add to said firewall is further based on said zone risk value and said source network authorization risk value.

3. The method of claim 1, further comprising:

the computer assigning a zone risk value to said destination network, said assigning said zone risk value including determining that said destination network is included in a zone of a plurality of predefined zones, said determining that said destination network is included in said zone including determining that a security control associated with said destination network is known or unknown and determining that an external access to said destination network is filtered, unfiltered, unknown or absent;

the computer assigning a destination network authorization risk value to said destination network, said assigning said destination network authorization risk value including classifying said destination network as being expected to act as a destination in a network communication session or being not expected to act as said destination based on predefined criteria;

the computer assigning a destination port authorization risk value to said destination port, said assigning said destination port authorization risk value including classifying said destination port as authorized or unauthorized;

the computer assigning a destination port weight to said destination port authorization risk value, said destination port weight included in a predefined set of port weights; and the computer assigning a destination breach impact risk value to said destination network, said assigning said destination breach impact risk value including classifying an impact of a breach of said destination network, wherein said determining and generating said electronic recommendation indicating whether to add to said firewall is further based on said zone risk value, said destination network authorization risk value, said destination port authorization risk value, said destination port weight and said destination breach impact risk value.

4. The method of claim 1, further comprising:

the computer determining that said source network is included in a first zone of a plurality of predefined zones, said determining that said source network is included in said first zone including determining that a security control associated with said source network is known or unknown and determining that an external access to said source network is filtered, unfiltered, unknown or absent;

the computer determining that a destination network is included in a second zone of said plurality of predefined zones, said determining that said destination network is included in said second zone including determining that a security control associated with said destination network is known or unknown and determining that an external access to said destination network is filtered, unfiltered, unknown or absent; and the computer assigning a communication risk value that classifies a risk associated with a network communication session between said source network and said destination network, said communication risk value associated with said first zone and said second zone.

5. The method of claim 1, wherein said message flow data further includes a source port associated with said message packet, and wherein said method further comprises:

the computer assigning a source authorization risk value to said source network, said assigning said source authorization risk value including determining that said source network is expected to act as a source in a network communication session or not expected to act as said source based on predefined criteria;

the computer assigning, to said source authorization risk value, a source port weight included in a predefined set of port weights; and the computer assigning a source breach impact risk value to said source network, said assigning said source breach impact risk value including classifying an impact of a breach of said source network, wherein said determining and generating said electronic recommendation indicating whether to add to said firewall is further based on said source authorization risk value, said source breach impact risk value and said source port weight.

6. The method of claim 1, further comprising:

the computer assigning a source zone risk value to said source network, said assigning said source zone risk value including determining that said source network is included in a first zone of a plurality of predefined zones, said determining that said source network is included in said first zone including determining that a security control associated with said source network is known or unknown and determining that an external access to said source network is filtered, unfiltered, unknown or absent;

the computer assigning a source network authorization risk value to said source network, said assigning said source network authorization risk value including classifying said source network as expected to act as a source in a network communication session or not expected to act as said source based on predefined criteria;

the computer assigning a destination zone risk value to said destination network, said assigning said destination zone risk value including determining that said destination network is included in a second zone of a plurality of predefined zones, said determining that said destination network is included in said second zone including determining that a security control associated with said destination network is known or unknown and determining that an external access to said destination network is filtered, unfiltered, unknown or absent;

the computer assigning a destination network authorization risk value to said destination network, said assigning said destination network authorization risk value including classifying said destination network as expected to act as a destination in a network communication session or not expected to act as said destination based on predefined criteria;

the computer assigning a destination port authorization risk value to said destination port, said assigning said destination port authorization risk value including classifying said destination port as authorized or unauthorized;

the computer assigning a destination port weight to said destination port authorization risk value, said destination port weight included in a predefined set of port weights;

the computer assigning a destination breach impact risk value to said destination network, said assigning said destination breach impact risk value including classifying an impact of a breach of said destination network;

the computer assigning a communication risk value that classifies a risk associated with a network communication session between said source network and said destination network, said communication risk value associated with said first zone and said second zone; and the computer evaluating an expression (SZ+SNA+(DZ+DNA)*DBI+DPA*DPW)*CR, wherein SZ is said source zone risk value, SNA is said source network authorization risk value, DZ is said destination zone risk value, DNA is said destination network authorization risk value, DBI is said destination breach impact risk value, DPA is said destination port authorization risk value, DPW is said destination port weight, and CR is said communication risk value, and wherein said determining and generating said electronic recommendation indicating whether to add to said firewall is further based on said expression (SZ+SNA+(DZ+DNA)*DBI+DPA*DPW)*CR.

7. The method of claim 1, wherein said determining and generating said electronic recommendation indicating whether to add to said firewall said message flow rule are further based on an impact value that weights said fourth risk value and a port weight that weights said fifth risk value, wherein said impact value indicates a level of impact on an organization, said level of impact associated with a breach of data in said second zone in which said destination network is located and based on sensitivity of said data, and wherein said port weight indicates a level of vulnerability of said destination port to said breach.

8. The method of claim 7, further comprising:
determining a sum of said first risk value, said third risk value, said second risk value weighted by said impact value, said fourth risk value weighted by said impact value, and said fifth risk value weighted by said port weight; and multiplying said sum by a communication risk value that classifies a risk of communicating said message packet from said first zone to said second zone in said communication session, wherein a total risk value is a result of said multiplying said sum by said communication risk value, and wherein said determining and generating said electronic recommendation indicating whether to add to said firewall said message flow rule are further based on said total risk value.

9. A computer system for determining whether to alter a firewall configuration, the computer system comprising:
a CPU:
a computer-readable memory;
a computer-readable, tangible storage device;

first program instructions to receive message flow data associated with a message packet that was blocked by a firewall based on the firewall not having a message flow rule which permitted passage of said message packet, said message flow data identifying a source network associated with said message packet, a destination network associated with said message packet and a destination port associated with said message packet;

second program instructions to determine a first risk value and a second risk value that indicate levels of trust respectively associated with first and second zones in which said source and destination networks are respectively located, a third risk value that indicates whether said source network is authorized to be a network that is a source of said message packet in a communication session, a fourth risk value that indicates whether said destination network is authorized to be a network that receives said message packet in said communication session, and a fifth risk value that indicates whether said destination port in said destination network is authorized to be a port that receives said message packet in said communication session; and third program instructions to determine and generate, based on the first, second, third, fourth and fifth risk values, an electronic recommendation indicating whether to add to said firewall a message flow rule that permits said message flow to pass, wherein said first, second and third program instructions are stored on said computer-readable, tangible storage device for execution by said CPU via said computer-readable memory.

10. The computer system of claim 9, further comprising:
fourth program instructions to assign a zone risk value to said source network by determining that said source network is included in a zone of a plurality of predefined zones, wherein said fourth program instructions to assign said zone risk value include fifth program instructions to determine that a security control associated with said source network is known or unknown and sixth program instructions to determine that an external access to said source network is filtered, unfiltered, unknown or absent; and seventh program instructions to assign a source network authorization risk value to said source network by determining if said source network is expected to act as a source in a network communication session based on predefined criteria, wherein said electronic recommendation indicating whether to add to said firewall said message flow rule is based on said zone risk value and said source network authorization risk value, and wherein said fourth, fifth, sixth and seventh program instructions are stored on said computer-readable, tangible storage device for execution by said CPU via said computer-readable memory.

11. The computer system of claim 9, further comprising:
fourth program instructions to assign a zone risk value to said destination network by determining that said destination network is included in a zone of a plurality of predefined zones, wherein said fourth program instructions to assign said zone risk value include fifth program instructions to determine that a security control associated with said destination network is known or unknown and sixth program instructions to determine that an external access to said destination network is filtered, unfiltered, unknown or absent;

seventh program instructions to assign a destination network authorization risk value to said destination network by classifying said destination network as being expected to act as a destination in a network communication session or being not expected to act as said destination based on predefined criteria;

eighth program instructions to assign a destination port authorization risk value to said destination port by classifying said destination port as authorized or unauthorized;

ninth program instructions to assign a destination port weight to said destination port authorization risk value, said destination port weight included in a predefined set of port weights; and tenth program instructions to assign a destination breach impact risk value to said destination network by classifying an impact of a breach of said destination network, wherein said electronic recommendation indicating whether to add to said firewall said message flow rule is based on said zone risk value, said destination network authorization risk value, said destination port authorization risk value, said destination port weight and said destination breach impact risk value, and wherein said fifth, sixth, seventh, eighth, ninth and tenth program instructions are stored on said computer-readable, tangible storage device for execution by said CPU via said computer-readable memory.

12. The computer system of claim 9, further comprising:

fourth program instructions to determine that said source network is included in a first zone of a plurality of predefined zones by determining that a security control associated with said source network is known or unknown and determining that an external access to said source network is filtered, unfiltered, unknown or absent;

fifth program instructions to determine that a destination network is included in a second zone of said plurality of predefined zones by determining that a security control associated with said destination network is known or unknown and determining that an external access to said destination network is filtered, unfiltered, unknown or absent; and sixth program instructions to assign a communication risk value that classifies a risk associated with a network communication session between said source network and said destination network, said communication risk value associated with said first zone and said second zone, wherein said fourth, fifth and sixth program instructions are stored on said computer-readable, tangible storage device for execution by said CPU via said computer-readable memory.

13. The computer system of claim 9, wherein said message flow data further includes a source port associated with said message packet, and wherein said computer system further comprises:

fourth program instructions to assign a source authorization risk value to said source network by determining that said source network is expected to act as a source in a network communication session or not expected to act as said source based on predefined criteria;

fifth program instructions to assign a source port weight included in a predefined set of port weights to said source authorization risk value; and sixth program instructions to assign a source breach impact risk value to said source network by classifying an impact of a breach of said source network, wherein said electronic recommendation indicating whether to add to said firewall said message flow rule is based on said source authorization risk value, said source breach impact risk value and said source port weight, and wherein said fourth, fifth and sixth program instructions are stored on said computer-readable, tangible storage device for execution by said CPU via said computer-readable memory.

14. The computer system of claim 9, further comprising:

fourth program instructions to assign a source zone risk value to said source network by determining that said source network is included in a first zone of a plurality of predefined zones, wherein said fourth program instructions to assign said source zone risk value include fifth program instructions to determine that a security control associated with said source network is known or unknown and sixth program instructions to determine that an external access to said source network is filtered, unfiltered, unknown or absent;

seventh program instructions to assign a source network authorization risk value to said source network by classifying said source network as expected to act as a source in a network communication session or not expected to act as said source based on predefined criteria;

eighth program instructions to assign a destination zone risk value to said destination network by determining that said destination network is included in a second zone of a plurality of predefined zones, wherein said eighth program instructions to assign said destination zone risk value include ninth program instructions to determine that a security control associated with said destination network is known or unknown and tenth program instructions to determine that an external access to said destination network is filtered, unfiltered, unknown or absent;

eleventh program instructions to assign a destination network authorization risk value to said destination network by classifying said destination network as expected to act as a destination in a network communication session or not expected to act as said destination based on predefined criteria;

twelfth program instructions to assign a destination port authorization risk value to said destination port by classifying said destination port as authorized or unauthorized;

thirteenth program instructions to assign a destination port weight to said destination port authorization risk value, said destination port weight included in a predefined set of port weights;

fourteenth program instructions to assign a destination breach impact risk value to said destination network by classifying an impact of a breach of said destination network; and fifteenth program instructions to assign a communication risk value that classifies a risk associated with a network communication session between said source network and said destination network, said communication risk value associated with said first zone and said second zone; and sixteenth program instructions to evaluate an expression (SZ+SNA+(DZ+DNA)*DBI+DPA*DPW)*CR, wherein SZ is said source zone risk value, SNA is said source network authorization risk value, DZ is said destination zone risk value, DNA is said destination network authorization risk value, DBI is said destination breach impact risk value, DPA is said destination port authorization risk value, DPW is said destination port weight, and CR is said communication risk value, wherein said electronic recommendation is based on said expression (SZ+SNA+(DZ+DNA)*DBI+DPA* DPW)*CR, and wherein said fourth through said sixteenth program instructions are stored on said computer-readable, tangible storage device for execution by said CPU via said computer-readable memory.

15. A computer program product comprising a computer-readable, tangible storage device(s) and computer-readable program instructions stored on the computer-readable, tangible storage device(s) to determine whether to alter a firewall configuration, the computer-readable program instructions, when executed by a CPU:

receive message flow data associated with a message packet that was blocked by a firewall based on the firewall not having a message flow rule which permitted passage of said message packet, said message flow data identifying source network associated with said message packet, a destination network associated with said message packet and a destination port associated with said message packet;

determine a first risk value and a second risk value that indicate levels of trust respectively associated with first and second zones in which said source and destination networks are respectively located, a third risk value that indicates whether said source network is authorized to be a network that is a source of said message packet in a communication session, a fourth risk value that indicates whether said destination network is authorized to be a network that receives said message packet in said communication session, and a fifth risk value that indicates whether said destination port in said destination network is authorized to be a port that receives said message packet in said communication session; and based on the first, second, third, fourth and fifth risk values, determine and generate an electronic recommendation indicating whether to add to said firewall a message flow rule that permits said message flow to pass.

16. The program product of claim 15, wherein the computer-readable program instructions, when executed by the CPU further:

assign a zone risk value to said source network by determining that said source network is included in a zone of a plurality of predefined zones, wherein said determining that said source network is included in said zone includes determining that a security control associated with said source network is known or unknown and determining that an external access to said source network is filtered, unfiltered, unknown or absent; and assign a source network authorization risk value to said source network by determining if said source network is expected to act as a source in a network communication session based on predefined criteria, wherein said electronic recommendation is based on said zone risk value and said source network authorization risk value.

17. The program product of claim 15, wherein the computer-readable program instructions, when executed by the CPU further:

assign a zone risk value to said destination network by determining that said destination network is included in a zone of a plurality of predefined zones, wherein determining that said destination network is included in said zone includes determining that a security control associated with said destination network is known or unknown and determining that an external access to said destination network is filtered, unfiltered, unknown or absent;

assign a destination network authorization risk value to said destination network by classifying said destination network as being expected to act as a destination in a network communication session or being not expected to act as said destination based on predefined criteria;

assign a destination port authorization risk value to said destination port by classifying said destination port as authorized or unauthorized;

assign a destination port weight to said destination port authorization risk value, said destination port weight included in a predefined set of port weights; and assign a destination breach impact risk value to said destination network by classifying an impact of a breach of said destination network, wherein said electronic recommendation is based on said zone risk value, said destination network authorization risk value, said destination port authorization risk value, said destination port weight and said destination breach impact risk value.

18. The program product of claim 15, wherein the computer-readable program instructions, when executed by the CPU further:

determine that said source network is included in a first zone of a plurality of predefined zones by determining that a security control associated with said source network is known or unknown and determining that an external access to said source network is filtered, unfiltered, unknown or absent;

determine that a destination network is included in a second zone of said plurality of predefined zones by determining that a security control associated with said destination network is known or unknown and determining that an external access to said destination network is filtered, unfiltered, unknown or absent; and assign a communication risk value that classifies a risk associated with a network communication session between said source network and said destination network, said communication risk value associated with said first zone and said second zone.

19. The program product of claim 15, wherein said message flow data further includes a source port associated with said message packet, and wherein the computer-readable program instructions, when executed by the CPU further:

assign a source authorization risk value to said source network by determining that said source network is expected to act as a source in a network communication session or not expected to act as said source based on predefined criteria;

assign a source port weight included in a predefined set of port weights to said source authorization risk value; and assign a source breach impact risk value to said source network by classifying an impact of a breach of said source network, wherein said electronic recommendation is based on said source authorization risk value, said source breach impact risk value and said source port weight.

20. The program product of claim 15, wherein the computer-readable program instructions, when executed by the CPU further:

assign a source zone risk value to said source network by determining that said source network is included in a first zone of a plurality of predefined zones, wherein said determining that said source network is included in said first zone includes determining that a security control associated with said source network is known or unknown and determining that an external access to said source network is filtered, unfiltered, unknown or absent;

assign a source network authorization risk value to said source network by classifying said source network as expected to act as a source in a network communication session or not expected to act as said source based on predefined criteria;

assign a destination zone risk value to said destination network by determining that said destination network is included in a second zone of a plurality of predefined zones, wherein said determining that said destination network is included in said second zone includes determining that a security control associated with said destination network is known or unknown and determining that an external access to said destination network is filtered, unfiltered, unknown or absent;

assign a destination network authorization risk value to said destination network by classifying said destination network as expected to act as a destination in a network communication session or not expected to act as said destination based on predefined criteria;

assign a destination port authorization risk value to said destination port by classifying said destination port as authorized or unauthorized;

assign a destination port weight to said destination port authorization risk value, said destination port weight included in a predefined set of port weights;

assign a destination breach impact risk value to said destination network by classifying an impact of a breach of said destination network; and assign a communication risk value that classifies a risk associated with a network communication session between said source network and said destination network, said communication risk value associated with said first zone and said second zone, evaluate said total risk value an expression (SZ+SNA+(DZ+DNA)*DBI+DPA*DPW)*CR, wherein SZ is said source zone risk value, SNA is said source network authorization risk value, DZ is said destination zone risk value, DNA is said destination network authorization risk value, DBI is said destination breach impact risk value, DPA is said destination port authorization risk value, DPW is said destination port weight, and CR is said communication risk value, and wherein said electronic recommendation is based on said expression (SZ+SNA+(DZ+DNA)*DBI+DPA*DPW)*CR.

* * * * *